United States Patent [19]
Gee

[11] Patent Number: 6,087,317
[45] Date of Patent: Jul. 11, 2000

[54] PARTICLE SIZE STABLE SILICONE EMULSIONS

[75] Inventor: Ronald Paul Gee, Midland, Mich.

[73] Assignee: Dow Corning Corporation, Midland, Mich.

[21] Appl. No.: 09/209,515

[22] Filed: Dec. 10, 1998

[51] Int. Cl.$^7$ ..................................................... C11D 17/00
[52] U.S. Cl. ........................ 510/417; 510/242; 510/245; 510/284; 510/347; 510/466; 516/53; 516/58; 516/76
[58] Field of Search ................................. 516/53, 58, 76; 510/245, 242, 284, 347, 417, 466

[56] References Cited

U.S. PATENT DOCUMENTS

| | | | |
|---|---|---|---|
| 2,755,194 | 7/1956 | Volkman | 106/285 |
| 4,784,844 | 11/1988 | Thimineur | 424/65 |
| 4,999,398 | 3/1991 | Graver et al. | 524/837 |
| 5,300,286 | 4/1994 | Gee | 424/78.03 |
| 5,443,747 | 8/1995 | Inada et al. | 134/1 |
| 5,684,085 | 11/1997 | Gee et al. | 516/53 |
| 6,013,683 | 1/2000 | Hill et al. | 516/76 |

OTHER PUBLICATIONS

McCutcheon's vol. 1: Emulsifiers & Detergents 1993 North American Edition, (McCutcheon Division, MC Publishing Co., Glen Rock, NJ, USA, Copyright 1993) pp. 27 and 201, Jan. 1994.

*Primary Examiner*—Richard D. Lovering
*Assistant Examiner*—Daniel S. Metzmaier
*Attorney, Agent, or Firm*—James L. DeCesare

[57] ABSTRACT

By using a nonionic surfactant as the primary emulsifier having an hydrophilic-lipophilic balance (HLB) greater than about 13, at a concentration sufficient to provide about 0.5–3 molecules per 100 square Å of surface area of silicone particles; and a nonionic cosurfactant having an HLB less than about 11, at a concentration sufficient to provide 5–15 molecules of emulsifier per 100 square Å of surface area of silicone particles; aqueous emulsions containing low molecular weight silicones can be prepared which possess improved particle size stability. In particular, the low molecular weight silicones have a molecular weight less than about 1,000, and a viscosity of not greater than about 5 mm$^2$/sec. These emulsions can be used in applications relating to laundry pre-spotting, automotive bug and tar removal, and hard surface cleaning.

4 Claims, No Drawings

PARTICLE SIZE STABLE SILICONE EMULSIONS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

Emulsions of volatile or low molecular weight silicone fluids such as octamethylcyclotetrasiloxane ($D_4$), decamethylcyclopentasiloxane ($D_5$), hexamethyldisiloxane (MM), and divinyltetramethyldisiloxane, for example, are generally considered unstable, because these types of silicones diffuse from smaller emulsion particles through the water into larger particles. Due to a phenomenon known as Ostwald Ripening, such emulsions increase in particle size with time, and then separate by creaming.

This invention, however, is directed to unique emulsions of volatile or low molecular weight silicone fluids and oils which do not increase in particle size with aging, and which are also stable to heating and freezing.

Thus, certain types, amounts, and ratios of two or more surfactants, are necessary to achieve this superior emulsion stability. It is also necessary for the silicone fluid to possess a melting point which is below the storage temperature of the emulsion, or preferably, to have a melting point which is less than the freezing point of water.

The emulsions are useful, for example, in laundry prespotting, automotive bug and tar removing, and hard surface cleaning applications.

BACKGROUND OF THE INVENTION

Aqueous emulsions of polymeric silicone fluids that are stable in terms of particle size are known and used in a variety of applications. Stability is generally achieved by preventing coalescence of the particles by means of ionic or steric repulsion between particles due to the adsorption of a surfactant on the particle surface.

Emulsions of low molecular weight silicones, including cyclosiloxanes such as $D_4$, $D_5$, and $D_6$, and volatile trimethylsiloxy terminated siloxane oligomers such as hexamethyldisiloxane are also known.

Emulsions of these low molecular weight silicone materials can be made mechanically, and some examples of such emulsions can be found, for example, in U.S. Pat. No. 2,755,194 (Jul. 17, 1956); U.S. Pat. No. 4,784,844 (Nov. 15, 1988; and U.S. Pat. No. 5,300,286 (Apr. 5, 1994). However, emulsions of the low molecular weight silicones do not retain their initial particle size, and subsequently increase in diameter with time. This is generally due to a process known as Ostwald Ripening in which a low molecular weight emulsified liquid has a sufficient solubility in water, such that it diffuses from smaller sized particles or droplets through the aqueous phase into larger particles. This results in a net increase in average particle size of the emulsion with time.

This phenomenon leads to an inconsistent behavior or performance pattern of the emulsion in commercial use, due to the changing properties of these emulsions with age.

This invention, in contrast, is intended to provide an effective avenue for preventing, or at least minimizing, the increases in emulsion particle or droplet size with age; with the result that it provides for production of stable emulsions of low molecular weight silicone oils. For purposes of this invention, the phrase low molecular weight is intended to mean a molecular weight generally less than about 1,000. Thus, it is considered that silicones having a molecular weight in excess of about 1,000 have no significant solubility in water, and hence would not be adversely effected by Ostwald's Ripening phenomenon.

This invention, it is noted, further differentiates from what is known in the prior art, in that, with respect to the '194 patent, the HLB of the nonionic cosurfactant according to this invention is less than 11, compared to the HLB of the nonionic emulsifier in the '194 patent which is 14.1. With respect to the '844 patent, the present invention employs a total in parts by weight of emulsifiers per 100 parts by weight of silicone of only 1.4–218, compared to the use of 0.7–666 parts by weight of emulsifiers per 100 parts by weight of silicone in the '844 patent. Thus, the range in this invention is within the range of the '884 patent, but it is narrowly focused and is accompanied by new and unexpected results, i.e., the emulsions do not increase in particle size with aging. Regarding the '286 patent, while Table XI in the '286 patent refers to the use of a single silicone, it has a viscosity of 1,000 centistoke, whereas the single silicone used in this invention has a viscosity of no greater than 5 centistoke.

BRIEF SUMMARY OF THE INVENTION

This invention relates to an aqueous silicone emulsion that possesses improved particle size stability. The emulsion contains 5 to 65% by weight of a low molecular weight silicone. The silicone in the emulsion preferably has a molecular weight less than about 1,000, and it has a viscosity of not greater than about 5 $mm^2$/sec.

The emulsion also contains at least one primary emulsifier. The primary emulsifier is preferably a nonionic emulsifier having an hydrophilic-lipophilic balance (HLB) greater than about 13. The nonionic emulsifier is present in the emulsion at a concentration sufficient to provide about 0.5 to 3 molecules per 100 square Angstrom (Å) of surface area of silicone particles.

In an alternate embodiment, an anionic, cationic or an amphoteric emulsifier, can be used as the primary emulsifier. In this alternate embodiment, the primary emulsifier is present in the emulsion at a concentration sufficient to provide about 0.5 to 10 molecules per 100 square Angstrom of surface area of silicone particles.

The emulsion further contains at least one nonionic emulsifier which functions as a cosurfactant. The nonionic cosurfactant has an hydrophilic-lipophilic balance (HLB) less than about 11. The nonionic cosurfactant is present in the emulsion at a concentration sufficient to provide 5 to 15 molecules of emulsifier per 100 square Angstrom of surface area of silicone particles.

Preferably, the silicone is present in the emulsion in the form of droplets or particles having a size, i.e., an average diameter, between about 100 to about 1,000 nanometer.

The balance of the emulsion to 100% includes water, and minor amounts of common adjuvants such as a preservative; a fungicide; a rust or corrosion inhibitor; an antioxidant; a perfume; a dye or colorant; or a freeze-thaw stabilizer such as ethylene glycol or propylene glycol.

It is therefore an object of this invention to produce emulsions of low molecular weight silicones which have a sufficiently small particle size, such that they do not exhibit significant creaming, but which remain essentially stable in the uniformity of the silicone concentration with age. To this end, the invention provides emulsions having an average particle size preferably in the range of about 100 to about 1,000 nanometer, and wherein the amount of emulsifiers is sufficient to provide for establishing one mixed monolayer on the particle surface, as well as establishing a second inner monolayer of essentially water insoluble emulsifier.

While thickeners to moderately increase the viscosity of the aqueous phase may be used to prevent creaming of larger particle size emulsions in this range, it is believed that the surfactant bilayer will provide a significant barrier to prevent, or at least to retard, the diffusion of the low molecular weight silicone oil out of the particle.

It is another object of this invention to provide stable emulsions of low molecular weight silicones that are low in viscosity for the ease of handling. Thus, emulsions according to this invention have a silicone oil concentration of about 65% by weight or less, and can be easily handled by pouring or pumping due to their low viscosity.

These and other features and objects of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

According to this invention, it is possible to produce unusually improved stability emulsions of low molecular weight silicone oils and fluids that exhibit no, or at least a minimal, increase in their particle size with age. This is accomplished by using at least two emulsifiers at very specific concentrations.

One emulsifier functions to prevent the coalescence of particles by steric or ionic repulsion between the particles, and it is referred to herein as the primary surfactant or the primary emulsifier. The primary emulsifier can be either a nonionic, an anionic, a cationic, or an amphoteric type surfactant.

If a nonionic surfactant is selected as the primary emulsifier, it should have an HLB greater than about 13, preferably greater than 15, and should be present in the emulsion at a concentration of about 0.5 to 3 molecules per 100 square Angstrom of surface area of silicone particles.

On the other hand, if an anionic, a cationic, or an amphoteric surfactant is selected as the primary emulsifier, it should be present in the emulsion at a concentration of about 0.5 to 10 molecules per 100 square Angstrom of surface area of silicone particles.

It should be noted that in the case of very dilute emulsions with relatively large particle size, where the concentration of the primary emulsifier may tend to become low by these limitations, it may be necessary to increase the amounts by the critical micelle concentration (CMC) of the emulsifier, in order to adjust for the amount that may be dissolved in the water phase.

The second emulsifier which is used herein is referred to as the cosurfactant. The cosurfactant functions to prevent particle size increase with time by preventing the diffusion of the silicone out of the particle which could result in the Ostwald Ripening phenomenon. The cosurfactant should have an HLB less than about 11, and is preferably present in the emulsion at a concentration of about 5 to 15, more preferably 7 to 15, molecules per 100 square Angstrom of surface area of silicone particles.

This concentration results in an adsorbed inner layer of cosurfactant between the silicone and the outer layer of a mixture of both surfactants which contacts the water phase. This provides a barrier which prevents diffusion of silicone into the water phase.

Higher amounts of cosurfactant are generally unnecessary and may lead to emulsion instability. Emulsion particle or droplet size as referred to herein are the intensity weighted diameters as measured by dynamic light scattering (photon correlation spectroscopy). A NICOMP Particle Sizer instrument was used in making these determinations.

The desired emulsion particle size, i.e., 100–1,000 nanometer, to provide the correct range of surfactant coverage on the particles may be achieved by adjusting the shearing conditions as needed. That is, if the particle size and the surface coverage is determined to be too large, an increase in shear is required or an increase in sonolation pressure. If it is determined that the surface coverage is too low, due perhaps to a particle size that is too small, then this will require either a decrease in the shearing intensity, and/or an increase in the amount of the cosurfactant as needed.

The preferred primary surfactant according to this invention is a nonionic surfactant which has an HLB value greater than 13.0, and preferably greater than 15.0. Representative emulsifiers in this category of nonionic surfactant which are solids at room temperature are: (i) Brij 700 which is a polyoxyethylene stearyl ether and a product of ICI Americas Inc. of Wilmington, Del., having an HLB value of 18.8; (ii) Mapeg® S-40K which is a polyoxyethylene monostearate and a product and trademark of PPG/Mazer of Gurnee, Ill., having an HLB value of 17.2; (iii) Macol® SA-40 which is steareth-40 and a product and trademark of PPG/Mazer of Gurnee, Ill., having an HLB value of 17.4; (iv) Triton® X-405 which is octylphenoxy polyethoxy ethanol and a product and trademark of Union Carbide Chem. & Plastics Co., Industrial Chemicals Div., Danbury, Conn., having an HLB value of 17.9; (v) Macol® SA-20 which is steareth-20 and a product and trademark of PPG/Mazer of Gurnee, Ill., having an HLB value of 15.4; and (vi) Tergitol® 15-S-20 which is a C11–C15 secondary alcohol ethoxylate and a product and trademark of Union Carbide Chem. & Plastics Co., Industrial Chemicals Div., Danbury, Conn., having an HLB value of 16.3.

Some additional examples of other suitable primary nonionic surfactants which can be used are Tween 80, a polyoxyethylene (20) sorbitan monooleate, and a product of ICI Americas Inc. of Wilmington, Del., having an HLB value of 15.0; Triton® X-100 which is another octylphenoxy polyethoxy ethanol and a product and trademark of Union Carbide Chem. & Plastics Co., Industrial Chemicals Div., Danbury, Conn., having an HLB value of 13.5; and Triton® X-705 which is also an octylphenoxy polyethoxy ethanol and a product and trademark of Union Carbide Chem. & Plastics Co., Industrial Chemicals Div., Danbury, Conn., having an HLB value of 18.7.

Instead of using a nonionic surfactant as the primary surfactant, it is also possible to use an anionic surfactant, a cationic surfactant, or an amphoteric surfactant, as the primary surfactant.

Suitable anionic surfactants include but are not limited to sulfonic acids and their salt derivatives. Useful anionic surfactants are alkali metal sulfosuccinates; sulfonated glyceryl esters of fatty acids such as sulfonated monoglycerides of coconut oil acids; salts of sulfonated monovalent alcohol esters such as sodium oleyl isothionate; amides of amino sulfonic acids such as the sodium salt of oleyl methyl tauride; sulfonated products of fatty acid nitriles such as palmitonitrile sulfonate; sulfonated aromatic hydrocarbons such as sodium alpha-naphthalene monosulfonate; condensation products of naphthalene sulfonic acids with formaldehyde; sodium octahydro anthracene sulfonate; alkali metal alkyl sulfates; ether sulfates having alkyl groups of eight or more carbon atoms; and alkylaryl sulfonates having one or more alkyl groups of eight or more carbon atoms.

Commercial anionic surfactants useful in this invention include triethanolamine linear alkyl sulfonate sold under the tradename BIO-SOFT N-300 by Stepan Company, Northfield, Ill.; the sodium salt of dodecylbenzene sulfonic acid sold under the tradename SIPONATE DS-10 by Alcolac Inc., Baltimore, Md.; and sodium n-hexadecyl diphenyloxide disulfonate sold under the tradename DOWFAX 8390 by The Dow Chemical Company, Midland, Mich.

Useful cationic surfactants are the fatty acid amines, amides, and derivatives, and salts of fatty acid amines and amides. Cationic surfactants can be exemplified by aliphatic fatty amines and derivatives such as dodecyl amine acetate, octadecyl amine acetate, and acetates of amines of tallow fatty acids; homologues of aromatic amines having fatty chains such as dodecyl aniline; fatty amides derived from aliphatic diamines such as undecyl imidazoline; fatty amides derived from di-substituted amines such as oleylamino diethylamine; derivatives of ethylene diamine; quaternary ammonium compounds such as tallow trimethylammonium chloride, dioctadecyldimethyl ammonium chloride, didodecyldimethyl ammonium chloride, and dihexadecyldimethyl ammonium chloride; amide derivatives of amino alcohols such as beta-hydroxyethyl stearyl amide; amine salts of long chain fatty acids; quaternary ammonium bases derived from fatty amides of di-substituted diamines such as oleylbenzylamino ethylene diethylamine hydrochloride; quaternary ammonium bases of benzimidazolines such as methylheptadecyl benzimidazole hydrobromide; basic compounds of pyridinium and derivatives such as cetylpyridinium chloride; sulfonium compounds such as octadecyl sulfonium methyl sulfate; quaternary ammonium compounds of betaine such as betaine compounds of diethylamino acetic acid, and octadecylchloromethyl ether; urethanes of ethylene diamine such as condensation products of stearic acid and diethylene triamine; polyethylene diamines; and polypropanol polyethanol amines.

Commercial cationic surfactants include products sold under the tradenames ARQUAD T-27W, 16-29, C-33, T-50; and ETHOQUAD T/13 and T/13 ACETATE; by Akzo Chemicals Inc., Chicago, Ill.

Some suitable primary surfactants classified as amphoteric include cocoamphocarboxyglycinate, cocoamphocarboxypropionate, cocobetaine, N-cocamidopropyldimethylglycine, and N-lauryl-N-carboxymethyl-N-(2-hydroxyethyl)ethylenediamine. Other suitable amphoteric surfactants include the quaternary cycloimidates, betaines, and sultaines.

The betaines have the structure $R1R2R3N^+(CH_2)_mCOO^-$ in which R1 is an alkyl group having about twelve to eighteen carbon atoms or a mixture thereof; R2 and R3 are independently lower alkyl groups having one to three carbon atoms; and m is an integer having a value of from one to four. Specific betaines are alpha-(tetradecyldimethylammonio)acetate, beta-(hexadecyldiethylammonio)propionate, and gamma-(dodecyldimethylammonio)butyrate.

The sultaines have the structure $R1R2R3N^+(CH_2)_mSO_3^-$ in which R1, R2, R3, and m, are as defined above. Specific useful sultaines are 3-(dodecyldimethylammonio)-propane-1-sulfonate, and 3-(tetradecyldimethylammonio)ethane-1-sulfonate.

Representative amphoteric surfactants are products sold under tradenames or trademarks such as MIRATAINE® by Rhone-Poulenc Incorporated, Cranberry, N.J.; and TEGO BETAINE by Goldschmidt Chemical Corporation, Hopewell, Va. Imidazoline and imidazoline derivatives sold under the trademark MIRANOL® by Rhone-Poulenc Incorporated, Cranberry, N.J., may also be employed.

The cosurfactant is a nonionic surfactant which has an HLB value less than 11.0. Representative emulsifiers in this category which are solids at room temperature are: (a) Brij 52 which is a polyoxyethylene cetyl ether and a product of ICI Americas Inc. of Wilmington, Del., having an HLB value of 4.9; (b) Brij 72 which is a polyoxyethylene stearyl ether and a product of ICI Americas Inc. of Wilmington, Del., having an HLB value of 4.9; (c) Arlacel 60 which is sorbitan stearate and a product of ICI Americas Inc. of Wilmington, Del., having an HLB value of 4.7; (d) Aldo® MS which is glycerol monostearate and a product and trademark of Lonza Inc., of Fairlawn, N.J., having an HLB value of 3.9; (e) Aldo® PGHMS which is propylene glycol monostearate and a product and trademark of Lonza Inc., of Fairlawn, N.J., having an HLB value of 3.0; (f) Mapeg® EGMS which is ethylene glycol monostearate and a product and trademark of PPG/Mazer of Gurnee, Ill., having an HLB value of 2.9; (g) Hodag DGS which is diethylene glycol monostearate and a product of Hodag Chemical Corp., of Skokie, Ill., having an HLB value of 4.7; (h) Ethox SAM-2 which is a polyoxyethylene stearyl amine and a product of Ethox Chemicals, Inc., of Greenville, S.C., having an HLB value of 4.9; and (i) Macol® SA-2 which is a polyoxyethylene stearyl ester and a product and trademark of PPG/Mazer of Gurnee, Ill., having an HLB value of 4.9. Fatty alcohols such as lauryl alcohol, myristyl alcohol, and cetyl alcohol, may be considered to be nonionic surfactants with an HLB value of about one, and hence could be included in this category of nonionic surfactants.

Some additional examples of other suitable nonionic cosurfactants which can be used are GLYCOMUL® L, a sorbitan monolaurate, and a product and trademark of Lonza Incorporated, Fairlawn, N.J., having an HLB of 8.6; S-MAZ® 60K, a sorbitan monostearate, and a product and trademark of PPG Industries, Gurnee, Ill., having an HLB of 4.7; SPAN 20, a sorbitan monolaurate, and a product of ICI Surfactants, Wilmington, Del., having an HLB of 8.6; SPAN 60, a sorbitan monostearate, and a product of ICI Surfactants, Wilmington, Del., having an HLB of 4.7; TRITON® X-15, an octylphenoxypolyethoxyethanol, and a product and trademark of Union Carbide Corporation, Danbury, Connecticut, having an HLB of 3.6; TRITON® X-35, another octylphenoxypolyethoxyethanol, and a product and trademark of Union Carbide Corporation, Danbury, Conn., having an HLB of 7.8; and TRITON® X-45, also an octylphenoxypolyethoxyethanol, and a product and trademark of Union Carbide Corporation, Danbury, Conn., having an HLB of 10.4.

Each of the above named primary surfactants and the named cosurfactants are merely set forth for the purpose of identifying representative emulsifiers which may be employed in accordance with the precepts of the present invention. It should be understood that other equivalent nonionic, anionic, cationic, and amphoteric, emulsifier products may also be substituted.

As used herein, the phrase low molecular weight silicone oil is intended to mean and to include (i) low molecular weight linear and cyclic volatile methyl siloxanes, (ii) low molecular weight linear and cyclic volatile and non-volatile higher alkyl and aryl siloxanes, and (iii) low molecular weight functional linear and cyclic siloxanes. Most preferred, however, are the low molecular weight linear and cyclic volatile methyl siloxanes (VMS).

VMS compounds correspond to an average unit formula $(CH_3)_aSiO_{(4-a)/2}$ in which a has an average value of two to three. The compounds contain siloxane units joined by $\equiv Si-O-Si\equiv$ bonds. Representative units are monofunctional "M" units $(CH_3)_3SiO_{1/2}$ and difunctional "D" units $(CH_3)_2SiO_{2/2}$.

The presence of trifunctional "T" units $CH_3SiO_{3/2}$ results in the formation of branched linear or cyclic volatile methyl siloxanes. The presence of tetrafunctional "Q" units $SiO_{4/2}$ results in the formation of branched linear or cyclic volatile methyl siloxanes.

Linear VMS have the formula $(CH_3)_3SiO\{(CH_3)_2SiO\}_ySi(CH_3)_3$. The value of y is 0–7. Cyclic VMS have the formula $\{(CH_3)_2SiO\}_z$. The value of z is 3–6. Preferably, these volatile methyl siloxanes have a molecular weight of less than about 1,000; a boiling point less than about 250° C.; and a viscosity of about 0.65 to about 5.0 centistoke (mm²/s), generally not greater than 5.0 centistoke (mm²/s).

Representative linear volatile methyl siloxanes are hexamethyldisiloxane (MM) with a boiling point of 100° C., viscosity of 0.65 mm²/s, and formula $Me_3SiOSiMe_3$; octamethyltrisiloxane (MDM) with a boiling point of 152° C., viscosity of 1.04 mm²/s, and formula $Me_3SiOMe_2SiOSiMe_3$; decamethyltetrasiloxane ($MD_2M$) with a boiling point of 194° C., viscosity of 1.53 mm²/s, and formula $Me_3SiO(Me_2SiO)_2SiMe_3$; dodecamethylpentasiloxane ($MD_3M$) with a boiling point of 229° C., viscosity of 2.06 mm²/s, and formula $Me_3SiO(Me_2SiO)_3SiMe_3$; tetradecamethylhexasiloxane ($MD_4M$) with a boiling point of 245° C., viscosity of 2.63 mm²/s, and formula $Me_3SiO(Me_2SiO)_4SiMe_3$; and hexadecamethylheptasiloxane ($MD_5M$) with a boiling point of 270° C., viscosity of 3.24 mm²/s, and formula $Me_3SiO(Me_2SiO)_5SiMe_3$.

Representative cyclic volatile methyl siloxanes are hexamethylcyclotrisiloxane ($D_3$), a solid with a boiling point of 134° C., a molecular weight of about 223, and formula $\{(Me_2)SiO\}_3$; octamethylcyclotetrasiloxane ($D_4$) with a boiling point of 176° C., viscosity of 2.3 mm²/s, a molecular weight of about 297, and formula $\{(Me_2)SiO\}_4$; decamethylcyclopentasiloxane ($D_5$) with a boiling point of 210° C., viscosity of 3.87 mm²/s, a molecular weight of about 371, and formula $\{(Me_2)SiO\}_5$; and dodecamethylcyclohexasiloxane ($D_6$) with a boiling point of 245° C., viscosity of 6.62 mm²/s, a molecular weight of about 445, and formula $\{(Me_2)SiO\}_6$.

Representative branched volatile methyl siloxanes are heptamethyl-3-{(trimethylsilyl)oxy}trisiloxane ($M_3T$) with a boiling point of 192° C., viscosity of 1.57 mm²/s, and formula $C_{10}H_{30}O_3Si_4$; hexamethyl-3,3,bis {(trimethylsilyl)oxy} trisiloxane ($M_4Q$) with a boiling point of 222° C., viscosity of 2.86 mm²/s, and formula $C_{12}H_{36}O_4Si_5$; and pentamethyl {(trimethylsilyl)oxy} cyclotrisiloxane ($MD_3$) with the formula $C_8H_{24}O_4Si_4$.

The invention also includes using low molecular weight linear and cyclic volatile and non-volatile higher alkyl and aryl siloxanes, represented respectively by formulas $R_3SiO(R_2SiO)_ySiR_3$ and $(R_2SiO)_z$. R can be alkyl groups with 2–20 carbon atoms or aryl groups such as phenyl. The value of y is 0 to about 7. The value of z is 3–6. These values should be selected to provide polysiloxanes with a viscosity generally not greater than about 5 centistoke (mm²/s), and with a molecular weight of less than about 1,000. Illustrative of such polysiloxanes are polydiethylsiloxane, polymethylethylsiloxane, polymethylphenylsiloxane, and polydiphenylsiloxane.

Low molecular weight functional polysiloxanes can also be employed, and are represented by the formula $R_3SiO(RQSiO)_ySiR_3$ or the formula $(RQSiO)_z$ where Q is a functional group. Examples of such functional polysiloxanes are acrylamide functional siloxane fluids, acrylate functional siloxane fluids, amide functional siloxane fluids, amino functional siloxane fluids, carbinol functional siloxane fluids, carboxy functional siloxane fluids, chloroalkyl functional siloxane fluids, epoxy functional siloxane fluids, glycol functional siloxane fluids, ketal functional siloxane fluids, mercapto functional siloxane fluids, methyl ester functional siloxane fluids, perfluoro functional siloxane fluids, silanol functional siloxanes, and vinyl functional siloxane fluids. Again, the values of y and z, and the functional group Q, are selected to provide functional polysiloxanes with a viscosity generally not greater than about 5 centistoke (mm²/s), and a molecular weight of less than about 1,000.

Aqueous silicone emulsions containing silicone particles having a particle size of between about 100 to about 1,000 nanometer, can be suitably prepared according to this invention, by combining 5–65 percent by weight of the low molecular weight silicone; 0.1–62 percent by weight of the surfactants, of which amount 15–75 percent by weight is the primary emulsifier, and 25–85 percent by weight is the cosurfactant, as those terms are used herein; and 10–94.9 percent by weight of water.

Preferably, the aqueous silicone emulsion contains silicone particles having a particle size of between about 100 to about 500 nanometer, and is made by combining 25–65 percent by weight of the low molecular weight silicone; 1.5–47 percent by weight of the surfactants, of which amount 15–75 percent by weight is the primary emulsifier, and 25–85 percent by weight is the cosurfactant; and 10–73.5 percent by weight of water.

In yet more specific terms, an emulsion with a particle size of about 100 nanometer, can be made by combining a total of 14–218 parts by weight of the two surfactants per 100 parts by weight of the low molecular weight silicone, of which total amount, 1.5–143 parts by weight is the amount of the primary emulsifier used per 100 parts by weight of the low molecular weight silicone, and 12–75 parts by weight is the amount of the cosurfactant used per 100 parts by weight of the low molecular weight silicone.

To prepare emulsions with a particle size of about 300 nanometer, there is combined a total of 5–73 parts by weight of the two surfactants per 100 parts by weight of the low molecular weight silicone, of which total amount, 0.5–48 parts by weight is the amount of the primary emulsifier used per 100 parts by weight of the low molecular weight silicone, and 4–25 parts by weight is the amount of the cosurfactant used per 100 parts by weight of the low molecular weight silicone.

To prepare emulsions with a particle size of about 500 nanometer, there is required a total of 2.8–44 parts by weight of the two surfactants per 100 parts by weight of the low molecular weight silicone, of which total amount, 0.3–29 parts by weight is the amount of the primary emulsifier used per 100 parts by weight of the low molecular weight silicone, and 2.5–15 parts by weight is the amount of the cosurfactant used per 100 parts by weight of the low molecular weight silicone.

To prepare emulsions with a particle size of about 1,000 nanometer, there is required a total of 1.4–22 parts by weight of the two surfactants per 100 parts by weight of the low molecular weight silicone, of which total amount, 0.15–14 parts by weight is the amount of the primary emulsifier used per 100 parts by weight of the low molecular weight silicone, and 1.2–7.5 parts by weight is the amount of the cosurfactant used per 100 parts by weight of the low molecular weight silicone.

Since emulsions are susceptible to microbiological contamination, a preservative is generally required. Some suitable compositions include formaldehyde; 1,3-dimethylol-5,5-dimethyl (DMDM) hydantoin; 5-bromo-5-nitro-1,3-dioxane; methyl paraben; propyl paraben; sorbic acid; imidazolidinyl urea; and 5-chloro-2-methyl-4-isothiazolin-3-one, which is a preservative sold under the tradename KATHON by the Rohm & Haas Company, Philadelphia, Pa.

EXAMPLES

The invention is illustrated in further detail in the following representative examples. In these examples, and in Tables 1–6 which follow the examples, the equation used to calculate gamma ($\Gamma$) which is the number of surfactant molecules per 100 square Angstrom ($\text{Å}$), is shown below:

$$\Gamma = \% S \times D \div (9.96 \times 10^{-3} \times M \times \% \text{ Silicone})$$

wherein $\Gamma$ is the number of molecules of emulsifier/100 square $\text{Å}$; M is the molecular weight of the emulsifier; D is the diameter of the silicone particles in nanometer; and S is the weight percent of the emulsifier in the formulation.

Further, it is noted that in Tables 1–6, the amounts of the various components are expressed as the percent by weight based upon the total weight of the emulsion prepared; and where these amounts do not add up to exactly 100 percent, the balance to 100 percent is water. In addition, $\Gamma p$ in the Tables represents the number of molecules of the primary emulsifier/100 square $\text{Å}$, whereas $\Gamma c$ represents the number of molecules of the cosurfactant/100 square $\text{Å}$.

Reference to Kathon LX-1.5 in Tables 1–6 denotes a commercial preservative marketed for use in emulsions by the Rohm & Haas Company, Philadelphia, Pennsylvania. It is a solution of 5-chloro-2-methyl-4-isothiazolin-3-one, although other commercial products, such as noted above, can be employed for the prevention of microbial growth of organisms in the emulsion.

Comparison Example 1

The purpose of this example is to replicate Example 1 of U.S. Pat. No. 4,784,844 (Nov. 15, 1988), because no emulsion particle sizes are disclosed by the '844 patent. In addition, no reference is made in the '844 patent to the provision of stability in terms of preventing particle size growth with age of the emulsion. The '844 patent also does not reference the fact that an increase in particle size as a function of time is a disadvantage of an emulsion containing cyclopolysiloxanes.

Thus, Example 1 of the '844 patent was repeated in all its respects, and the resulting product was a jelly-like, very viscous, white emulsion. Vigorous stirring was used as called for in the procedure of Example 1 in the 844 patent. The particle size of the jelly-like, viscous, white emulsion was measured to be about 1700 nanometer, with a very broad or multi-modal particle size distribution. The particle size distribution was very broad, where the major population, i.e., about 75% by volume, had a peak diameter of about 1.7 microns. The emulsion had a concentration of decamethylpentasiloxane of about 72% by weight. It was diluted with additional water to a concentration of about 35% by weight of $D_5$, and only then could it be said to possess a water-like viscosity.

Reference may be had to Table 1 below for the details on this comparison example, which produced an emulsion with a particle size outside the scope of the present invention.

Example 1

To a beaker was added 375 g (643 parts) water, 47.85 g (82 parts) polyoxyethylene 40 stearate, and 39.15 g (67 parts) sorbitan monostearate. These components were heated to 65–75° C. with stirring until dissolved. Then 525 g (900 parts) $D_5$ was slowly added, and mixing was continued for 15 minutes, The composition was subjected to high shear by passing it through a high pressure sonolator at 1,700 psi/11,721 kPa. The composition was diluted with additional water to 35% by weight of $D_5$. The particle size was measured to be 398 nm. By a calculation based on this particle size using the formula set forth above, the particle surfaces had about 7.0 molecules of the cosurfactant sorbitan monostearate per 100 square Angstrom of surface area of the silicone particles, and about 1.8 molecules of the primary surfactant polyoxyethylene 40 stearate per 100 square Angstrom of the surface area of the silicone particles. As shown in Table 1, the particle size of this emulsion after 7 days was measured to be 441 nm, which is an increase of only about 11%.

Comparison Example 2

Example 6 in the '844 patent was replicated, using the same relative parts of emulsifiers per 100 parts of $D_5$t but a higher amount of water was used, and additionally sheared by sonolation at 1,700 psi/11,721 kPa. An emulsion was prepared, and the particle size was measured to be 281 nm. By a calculation using the formula set forth above, this comparison emulsion had 4.4 molecules of the cosurfactant sorbitan monostearate per 100 square Angstrom of the surface area of the silicone particles, and it had 2.2 molecules of the primary surfactant polyoxyethylene 40 octylphenylether per 100 square Angstrom of surface area of the silicone particles. After the elapse of 14 days as can be seen in Table 1, the particle size was measured to be 457 nm, which is a significant increase of 63%. This example illustrates the effect of over-shearing, which results in an insufficient surface concentration of the cosurfactant.

Example 2

Using the same procedure as outlined in Example 1, and with the components and amounts as set forth in Table 1, an emulsion was prepared having a particle size measured to be 426 nm. By calculation based on the formula above, the emulsion contained 7.7 molecules of the cosurfactant sorbitan monostearate, i.e., Span 60, per 100 square Angstrom of surface area of the silicone particles, and 2.0 molecules of the primary surfactant polyoxyethylene 40 stearylether, i.e., Macol SA40, per 100 square Angstrom of surface area of the silicone particles. As can be seen in Table 1, after 14 days the particle size was measured to be 446 nm, which is an increase of only 7%. A sample of this emulsion was also aged for 44 days at 50° C., and again measured and found to be 428 nm, indicating a change of essentially 0%.

TABLE 1

Effect of Number of Cosurfactant Molecules

|  | HLB | Comp. 1 | Ex. 1 | Comp. 2 | Ex. 2 |
|---|---|---|---|---|---|
| S-Maz ® 60K | 4.7 | 5.36 | 2.61 |  |  |
| Span 60 | 4.7 |  |  | 2.33 | 2.7 |
| Mapeg ® S-40K | 16.9 | 6.56 | 3.19 |  |  |
| Triton ® X-405 (100%) | 17.9 |  |  | 5.39 |  |
| Macol ® SA-40 | 17.4 |  |  |  | 3.3 |
| Initial Water |  | 16.02 | 25.00 | 22.7 | 25.00 |
| Sonolator Pressure, psi |  | none | 1700 | 1700 | 1700 |
| Kathon LX-1.5 |  | none | none | 0.03 | none |
| % Oil |  | 72.06 | 35 | 35 | 35 |
| Oil |  | $D_5$ | $D_5$ | $D_5$ | $D_5$ |
| Particle size, nm |  | 1700 | 398 | 281 | 426 |
| $\Gamma_p$ molecules/100 Å sq. |  | 7.5 | 1.8 | 2.2 | 2.0 |
| $\Gamma_c$ molecules/100 Å Sq. |  | 29.5 | 6.9 | 4.4 | 7.7 |
| Stability at 25° C. |  |  |  |  |  |
| Days aged |  |  | 7 | 14 | 14 |
| Particle size, nm |  |  | 441 | 457 | 446 |
| % Change |  |  | 11 | 63 | 7 |
| Oven Stability at 50° C. |  |  |  |  |  |
| Days aged |  |  | 6 | 44 |  |
| Particle size, nm |  |  | 403 | 428 |  |
| % Change |  |  | 43 | 0 |  |

Comparison Examples 3–6 and Example 3

Comparison Examples 3–6 illustrate an insufficient cosurfactant surface concentration, and hence emulsions prepared according to these four comparison examples are outside the scope of this invention. In contrast, Example 3 illustrates this invention and provides an emulsion with an adequate cosurfactant surface coverage.

Using the same procedure as outlined in Example 1, except that no heat was necessary as all of the surfactants were liquid or in solution, and with the components and amounts as set forth in Table 2, the five emulsions were prepared, and all five emulsions had an approximate particle size of 300 nm when initially made.

Comparison Examples 3–6 include the use of various types of emulsifiers having HLB values ranging from 3.6–12.4, but all of these emulsions have insufficient coverage of about 2–4 molecules of cosurfactant. On the other hand, Example 3 which is according to the invention, shows improved particle size stability obtained with Triton® X-15. In Example 3, there was an increase in the cosurfactant coverage to 8 molecules.

TABLE 2

Various Cosurfactants & Numbers of Molecules

|  | HLB | Comp. 3 | Comp. 4 | Comp. 5 | Comp. 6 | Ex. 3 |
|---|---|---|---|---|---|---|
| Triton ® X-15 | 3.6 |  |  |  | 1.26 | 2.50 |
| Triton ® X-35 | 7.8 |  |  | 1.03 |  |  |
| Triton ® X-45 | 10.4 |  | 1.18 |  |  |  |
| Triton ® X-114 | 12.4 | 1.25 |  |  |  |  |
| Triton ® X-405, 100% | 17.9 | 2.52 | 2.52 | 2.52 | 2.52 | 2.52 |
| Initial Water |  | 60.15 | 60.22 | 60.37 | 60.14 | 58.90 |
| Sonolator, psi |  | 1700 | 1700 | 1700 | 1700 | 1500 |
| Kathon LX-1.5 |  | none | none | none | none | none |
| % Oil |  | 35 | 35 | 35 | 35 | 35 |
| Oil |  | $D_5$ | $D_5$ | $D_5$ | $D_5$ | $D_5$ |
| Particle size, nm |  | 302 | 307 | 301 | 289 | 307 |
| $\Gamma_p$ molecules/100 Å$^2$ |  | 1.1 | 1.1 | 1.1 | 1.1 | 1.1 |
| $\Gamma_c$ molecules/100 Å$^2$ |  | 2.0 | 2.4 | 2.6 | 3.8 | 8.1 |
| Stability at 25° C. |  |  |  |  |  |  |
| Days aged |  | 7 | 7 | 9 | 9 | 7 |
| Particle size, nm |  | 811 | 655 | 572 | 522 | 350 |
| % Change |  | 169 | 113 | 90 | 81 | 14 |
| Stability at 50° C. |  |  |  |  |  |  |
| Days aged |  | 7 | 7 | 7 | 7 | 7 |
| Particle size, nm |  | 1110 | 795 | 752 | 712 | 546 |
| % Change |  | 268 | 159 | 150 | 146 | 78 |

Comparison Examples 7–8 and Example 4

Example 4, which is according to this invention, shows the beneficial effect of increasing the amount of cosurfactant Span 20, on the particle size stability, when compared to Comparison Examples 7 and 8. While all three emulsions had an adequate coverage Γp of primary surfactant, only the emulsion prepared in Example 4 had an adequate coverage Γc of cosurfactant.

Using the same procedure as outlined in Example 1, except that no heat was used, and with the components and amounts as set forth in Table 3, the three emulsions were prepared, and the number of cosurfactant molecules in each emulsion made were calculated to be about 3, 6 and 8, respectively. As can be seen in Table 3, after 7 days at room temperature, i.e., 20–25° C., the particle size stability ranged from 37% for the emulsion of Comparison Example 7, 14% for the emulsion of Comparison Example 8, to an effective zero percent change for the emulsion of Example 4. In some additional tests not shown in Table 3, and after 6 months at room temperature, the emulsion in Example 4 had a particle size of 322 nm, which is another effective zero percent change according to this invention.

TABLE 3

| | | Effect of Number of Cosurfactant Molecules | | |
|---|---|---|---|---|
| | HLB | Comp. 7 | Comp. 8 | Ex. 4 |
| Span 20 | 8.6 | 1.00 | 2.00 | 3.00 |
| Tween 80 | 15 | 3.30 | 3.30 | 3.30 |
| Initial Water | | 45.00 | 35.00 | 45.00 |
| Sonolator Pressure, psi | | 1600 | 1600 | 1600 |
| Kathon LX-1.5 | | 0.03 | 0.03 | 0.03 |
| % Oil | | 35 | 35 | 35 |
| Oil | | $D_5$ | $D_5$ | $D_5$ |
| Particle size, nm | | 370 | 337 | 328 |
| $\Gamma_p$ molecules/100 Å sq. | | 2.7 | 2.4 | 2.4 |
| $\Gamma_c$ molecules/100 Å sq. | | 3.1 | 5.6 | 8.2 |
| Stability @ 25° C. | | | | |
| Days aged | | 7 | 7 | 7 |
| Particle size, nm | | 508 | 383 | 312 |
| % Change | | 37 | 14 | −5 |
| Oven Stability @ 50° C. | | | | |
| Days aged | | 7 | 7 | 7 |
| Particle size, nm | | 530 | 328 | 321 |
| % Change | | 43 | −3 | −2 |

Examples 5–10

These six examples are according to this invention, and illustrate particle size stable emulsions prepared using various types of low molecular weight silicone oils. It can be seen in Table 4, that the number of primary emulsifier molecules Γp ranged from 0.7 to about 1.0, and that the number of cosurfactant molecules Γc ranged from about 7 to about 10.

Again, using the same procedure as outlined in Example 1, except that no heat was used, and with the components and amounts as set forth in Table 4, the six emulsions were prepared, using Span 20 and Triton® X-705. Prolonged particle size stability at 50° C. aging was demonstrated, and can be seen in Table 4.

The low molecular weight silicone oil used in Example 7 and shown in Table 4 as "0.65 cs" was hexamethyldisiloxane. The low molecular weight silicone oils used in Examples 8 and 9 and shown in Table 4 as "1 cs" and "5 cs" were polydimethylsiloxane fluids having the respective viscosity. In Example 10, the low molecular weight silicone was alkylmethylsilicone fluid 3-hexylheptamethyltrisiloxane.

In Table 4, it is noted that the amount of Triton® X-705 is expressed as 100 percent of active material, i.e., 3.00, whereas the total amount actually used was 4.29, which included the active material supplied in water.

TABLE 4

| | | Various Low Molecular Weight Silicone Oils | | | | | |
|---|---|---|---|---|---|---|---|
| | HLB | Ex. 5 | Ex. 6 | Ex. 7 | Ex. 8 | Ex. 9 | Ex. 10 |
| Span 20 | 8.6 | 3.00 | 3.00 | 3.00 | 3.00 | 3.00 | 3.00 |
| Triton ® X-705, 100% | 18.7 | 3.00 | 3.00 | 3.00 | 3.00 | 3.00 | 3.00 |
| Initial Water | | 23.71 | 23.71 | 23.71 | 23.71 | 23.71 | 23.71 |
| Sonolator, psi | | 1700 | 1700 | 1700 | 1700 | 1700 | 1700 |
| Kathon LX-1.5 | | 0.03 | 0.03 | 0.03 | 0.03 | 0.03 | 0.03 |
| % Oil | | 35 | 35 | 35 | 35 | 35 | 35 |
| Oil | | $D_5$ | $D_4$ | 0.65 cs | 1 cs | 5 cs | [MeHex Siloxane |
| Particle size, nm | | 286 | 307 | 416 | 341 | 308 | 315 |
| $\Gamma_p$ molecules/100 Å sq. | | 0.7 | 0.8 | 1.1 | 0.9 | 0.8 | 0.8 |
| $\Gamma_c$ molecules/100 Å sq. | | 7.1 | 7.6 | 10.3 | 8.5 | 7.7 | 7.8 |
| Stability @ 25° C. | | | | | | | |
| Days aged | | 14 50 243 | 44 | 44 | 14 | 14 | 14 |

TABLE 4-continued

|  | HLB | Various Low Molecular Weight Silicone Oils | | | | | |
| --- | --- | --- | --- | --- | --- | --- | --- |
|  |  | Ex. 5 | Ex. 6 | Ex. 7 | Ex. 8 | Ex. 9 | Ex. 10 |
| Particle size, nm |  | 325 | 372 | 419 | 364 | 299 | 348 |
|  |  | 352 |  |  |  |  |  |
|  |  | 364 |  |  |  |  |  |
| % Change |  | 14 | 21 | 1 | 7 | −3 | 8 |
| Stability @ 50° C. |  |  |  |  |  |  |  |
| Days aged |  | 54 | 152 | 152 | 152 | 152 | 44 |
| Particle size, nm |  | 339 | 331 | 413 | 328 | 308 | 330 |
| % Change |  | 19 | 15 | −1 | −4 | 2 | 5 |

Comparison Example 9 and Example 11

Using the same procedure as outlined in Example 1, except that no heat was used, and with the components and amounts as set forth in Table 5, two emulsions were prepared, using the low molecular weight silicone fluid divinyltetramethyldisiloxane. In Comparison Example 9, a lower sonolation pressure of 1200 psi/8274 kPa was used, so as to not over-emulsify and obtain a Γc which was too low. Comparision Example 9 shows that the use of a cosurfactant such as Triton® X-100, which has an HLB of 13.5, is unsuitable to stabilize the emulsion, even after only one day of aging at 25° C. Thus, the change in particle size was 132 percent. This is because the cosurfactant HLB was greater than about 11, which is beyond the range preferred for a cosurfactant according to this invention. On the other hand, and as can be seen in Table 5 with reference to Example 11, cosurfactant Span 20 has an HLB of 8.6, i.e., less than about 11, and is an effective cosurfactant according to the present invention.

TABLE 5

|  | Effect of Cosurfactant HLB | | |
| --- | --- | --- | --- |
|  | HLB | Ex. 11 | Comp. 9 |
| Span 20 | 8.6 | 3.00 |  |
| Triton ® X-100 | 13.5 |  | 2.38 |
| Triton ® X-405, 100% | 17.9 | 2.52 | 2.52 |
| Initial Water |  | 35.00 | 59.00 |
| Sonolator pressure, psi |  | 1700 | 1200 |
| Kathon LX-1.5 |  | none | none |
| % Oil |  | 35 | 35 |
| Oil |  | Me$_4$Vi$_2$Siloxane | Me$_4$Vi$_2$Siloxane |
| Particle size, nm |  | 347 | 707 |
| Γ$_p$ molecules/100 Å sq. |  | 1.3 | 2.6 |
| Γ$_c$ molecules/100 Å sq. |  | 8.6 | 7.7 |
| Stability @ 25° C. |  |  |  |
| Days aged |  | 1 | 1 |
| Particle size, nm |  | 355 | 1643 |
| % Change |  | 2 | 132 |

In the following additional examples, four emulsions were prepared using the same procedure as outlined in Example 1, except that no heat was used, and with the components and amounts as set forth in Table 6. The purpose of these four examples is to illustrate the use of anionic surfactants as a primary emulsifier, rather than using a nonionic surfactant as the primary emulsifier.

Comparison Example 10

This comparison example illustrates the instability of an emulsion of D$_5$ with an ample coverage Γp of an anionic primary emulsifier, but with an unsuitable cosurfactant having an HLB of 17.9. This emulsion also had too low a number of cosurfactant molecules Γc of 0.8, even though the cosurfactant in this example was used in a greater weight amount, than the cosurfactant used in Example 12 which provided a stable emulsion. In Table 6, it can be seen that the particle size increased from 221 nm to 500 nm in 7 days at room temperature, a change of 126 percent.

It is noted that in this comparison example, the anionic surfactant used as the primary emulsifier was an equivalent of Bio-Soft N-300 which was prepared in the laboratory. It was also a triethanolamine linear alkylate sulfonate made from triethanolamine and dodecylbenzenesulfonic acid.

Comparison Example 11 and Example 12

Comparison Example 11 shows that an emulsion of D$_5$ containing only an anionic surfactant but no cosurfactant, is unstable with respect to particle size. In Example 12, however, the presence of about 13 molecules Γc of Triton® X-15 as the cosurfactant provided particle size stability.

Example 13

This example demonstrates the preparation of an emulsion according to this invention, having a larger particle size, i.e., 977 nm. It should be noted that a larger initial particle size permits the use of a lower weight percent of surfactant, and that much lower shear forces can be used in preparing such an emulsion. This is an effective means to avoiding over-emulsification, which produces too small a particle size, resulting in a surfactant coverage on the particle surface which is too low.

TABLE 6

|  |  | Anionic Primary Surfactant | | | |
| --- | --- | --- | --- | --- | --- |
|  | HLB | Comp. 10 | Comp. 11 | Ex. 12 | Ex. 13 |
| Triton ® X-15 | 3.6 |  | 0 | 2.50 | 1.25 |
| Triton ® X-405 (100%) | 17.9 | 2.87 |  |  | 0.70 |
| Bio-Soft N-300 |  | 4.52 | 2.50 | 2.50 |  |
| Initial Water |  | 50.90 | 62.50 | 60.00 | 62.75 |
| Sonolator, psi |  | 1750 | 1500 | 1500 | 200 |
| Kathon LX-1.5 |  | 0.075 | none | none | none |
| % Oil |  | 39.2 | 35 | 35 | 35 |
| Oil |  | D$_5$ | D$_5$ | D$_5$ | D$_5$ |
| Particle size, nm |  | 221 | 617 | 475 | 977 |
| Γ$_p$ molecules/100 Å sq. |  | 5.4 | 9.3 | 7.2 | 1.0 |
| Γ$_c$ molecules/100 Å sq. |  | 0.8 | 0.0 | 12.5 | 12.9 |
| Stability @ 25° C. |  |  |  |  |  |
| Days aged |  | 7 | 7 | 7 | 14 |
| Particle size, nm |  | 500 | 890 | 490 | 1103 |
| % Change |  | 126 | 44 | 3 | 13 |

TABLE 6-continued

|  | HLB | Anionic Primary Surfactant | | | |
|---|---|---|---|---|---|
|  |  | Comp. 10 | Comp. 11 | Ex. 12 | Ex. 13 |
| Stability @ 50° C. |  |  |  |  |  |
| Days aged |  |  | 7 | 7 | 7 |
| Particle size, nm |  |  | 1055 | 520 | 1358 |
| % Change |  |  | 71 | 9 | 39 |

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. An aqueous silicone emulsion of improved silicone particle size stability consisting essentially of:
   (i) 5 to 65% by weight of a low molecular weight silicone, the silicone having a molecular weight less than 1,000, and a viscosity of not greater than 5 mm²/sec;
   (ii) at least one primary emulsifier selected from the group consisting of
      (a) a nonionic emulsifier having an HLB greater than about 13, the nonionic emulsifier being present in the emulsion at a concentration sufficient to provide about 0.5 to 3 molecules per 100 square Angstrom of surface area of silicone particles;
      (b) an anionic emulsifier being present in the emulsion at a concentration sufficient to provide about 0.5 to 10 molecules per 100 square Angstrom of surface area of silicone particles;
      (c) a cationic emulsifier being present in the emulsion at a concentration sufficient to provide about 0.5 to 10 molecules per 100 square Angstrom of surface area of silicone particles; and
      (d) an amphoteric emulsifier being present in the emulsion at a concentration sufficient to provide about 0.5 to 10 molecules per 100 square Angstrom of surface area of silicone particles;
   (iii) at least one nonionic emulsifier as cosurfactant having an HLB less than about 11, the nonionic cosurfactant being present in the emulsion at a concentration sufficient to provide 5 to 15 molecules of emulsifier per 100 square Angstrom of surface area of silicone particles;
   the silicone particles in the emulsion having a particle size of between about 100 to about 1,000 nanometer;
   (iv) the balance of the emulsion to 100% including water;
   the low molecular weight silicone having a formula selected from the group consisting of
   $(R_2SiO)_z$ in which R is an alkyl group with 1–20 carbon atoms or an aryl group, y is 0 to about 7, and z is 3–6,
   $(CH_3)_3SiO\{(CH_3)_2SiO\}_ySi(CH_3)_3$ or the formula $\{(CH_3)_2SiO\}_z$ in which y is 0 to about 7, and z is 3–6, and
   $R_3SiO(RQSiO)_ySiR_3$ or the formula $(RQSiO)_z$ where R is the same as defined above, Q is a vinyl functional group, and the value of y and z and group Q are selected to provide a viscosity not greater than 5 centistoke (mm²/s) and molecular weight less than 1,000.

2. An aqueous silicone emulsion according to claim 1 in which the low molecular weight silicone is selected from the group consisting of hexamethyldisiloxane, divinyltetramethyldisiloxane, octamethyltrisiloxane, decamethyltetrasiloxane, dodecamethylpentasiloxane, tetradecamethylhexasiloxane, hexadecamethylheptasiloxane, hexamethylcyclotrisiloxane, octamethylcyclotetrasiloxane, decamethylcyclopentasiloxane, and dodecamethylcyclohexasiloxane.

3. An aqueous silicone emulsion of improved silicone particle size stability consisting essentially of a composition formed by mechanically emulsifying:
   (i) 5 to 65% by weight of a single low molecular weight silicone having a molecular weight less than 1,000 and a viscosity of not greater than 5 mm²/sec;
   (ii) at least one primary emulsifier selected from the group consisting of
      (a) a nonionic emulsifier having an HLB greater than about 13, the nonionic emulsifier being present in the emulsion at a concentration sufficient to provide about 0.5 to 3 molecules per 100 square Angstrom of surface area of silicone particles;
      (b) an anionic emulsifier being present in the emulsion at a concentration sufficient to provide about 0.5 to 10 molecules per 100 square Angstrom of surface area of silicone particles;
      (c) a cationic emulsifier being present in the emulsion at a concentration sufficient to provide about 0.5 to 10 molecules per 100 square Angstrom of surface area of silicone particles; and
      (d) an amphoteric emulsifier being present in the emulsion at a concentration sufficient to provide about 0.5 to 10 molecules per 100 square Angstrom of surface area of silicone particles;
   (iii) at least one nonionic emulsifier as cosurfactant having an HLB less than about 11, the nonionic cosurfactant being present in the emulsion at a concentration sufficient to provide 5 to 15 molecules of emulsifier per 100 square Angstrom of surface area of silicone particles;
   the silicone particles in the emulsion having a particle size of between 100 to 1,000 nanometer;
   (iv) the balance of the emulsion to 100l including water;
   the single low molecular weight silicone having a formula selected from the group consisting of
   $(R_2SiO)_z$ in which R is an alkyl group with 1–20 carbon atoms or an aryl group, y is 0 to about 7, and z is 3–6,
   $(CH_3)_3SiO\{(CH_3)_2SiO\}_ySi(CH_3)_3$ or the formula $\{(CH_3)_2SiO\}_z$ in which y is 0 to about 7, and z is 3–6, and
   $R_3SiO(RQSiO)_ySiR_3$ or the formula $(RQSiO)_z$ where R is the same as defined above, Q is a vinyl functional group, with the proviso that the value of y and z and group Q are selected such as to provide a viscosity not greater than 5 mm²/s.

4. An aqueous silicone emulsion according to claim 3 in which the low molecular weight silicone is hexamethyldisiloxane, divinyltetramethyldisiloxane, octamethyltrisiloxane, decamethyltetrasiloxane, dodecamethylpentasiloxane, tetradecamethylhexasiloxane, hexadecamethylheptasiloxane, hexamethylcyclotrisiloxane, octamethylcyclotetrasiloxane, decamethylcyclopentasiloxane, or dodecamethylcyclohexasiloxane.

* * * * *